(12) United States Patent
Cho et al.

(10) Patent No.: US 9,176,670 B2
(45) Date of Patent: Nov. 3, 2015

(54) SYSTEM ARCHITECTURE BASED ON ASYMMETRIC RAID STORAGE

(75) Inventors: Byungcheol Cho, Seochogu (KR); Moon J. Kim, Wappingers Falls, NY (US)

(73) Assignee: Taejin Info Tech Co., Ltd., Seoul (KR)

( * ) Notice: Subject to any disclaimer, the term of this patent is extended or adjusted under 35 U.S.C. 154(b) by 193 days.

(21) Appl. No.: 13/094,058

(22) Filed: Apr. 26, 2011

(65) Prior Publication Data

US 2012/0278526 A1 Nov. 1, 2012

(51) Int. Cl.
*G06F 12/00* (2006.01)
*G06F 3/06* (2006.01)

(52) U.S. Cl.
CPC .............. *G06F 3/061* (2013.01); *G06F 3/0632* (2013.01); *G06F 3/0653* (2013.01); *G06F 3/0685* (2013.01); *G06F 3/0689* (2013.01)

(58) Field of Classification Search
CPC ............ G06F 11/1076; G06F 11/1441; G06F 11/108; G06F 11/2082; G06F 12/0284; G06F 12/0804; G06F 12/0238
See application file for complete search history.

(56) References Cited

U.S. PATENT DOCUMENTS

| | | | | |
|---|---|---|---|---|
| 5,526,506 | A * | 6/1996 | Hyatt | 711/111 |
| 5,602,999 | A * | 2/1997 | Hyatt | 711/1 |
| 5,708,850 | A * | 1/1998 | Staros | 710/48 |
| 6,397,348 | B1 * | 5/2002 | Styczinski | 714/6.12 |
| 6,401,170 | B1 * | 6/2002 | Griffith et al. | 711/114 |
| 6,470,421 | B1 * | 10/2002 | Bui et al. | 711/114 |
| 6,601,138 | B2 * | 7/2003 | Otterness et al. | 711/114 |
| 6,671,751 | B1 * | 12/2003 | Chen et al. | 710/36 |
| 6,792,505 | B2 * | 9/2004 | Otterness et al. | 711/114 |
| 6,795,873 | B1 * | 9/2004 | Barth et al. | 710/15 |
| 6,876,589 | B2 * | 4/2005 | LaBerge | 365/200 |
| 6,883,065 | B1 * | 4/2005 | Pittelkow et al. | 711/114 |
| 7,051,156 | B2 * | 5/2006 | Shang | 711/114 |
| 7,111,144 | B2 * | 9/2006 | Hardman et al. | 711/173 |
| 7,152,142 | B1 | 12/2006 | Guha et al. | |
| 7,305,668 | B2 * | 12/2007 | Kennedy et al. | 717/168 |
| 7,548,982 | B2 * | 6/2009 | Gu et al. | 709/228 |
| 7,565,563 | B2 * | 7/2009 | Gappisch et al. | 713/401 |
| 7,636,801 | B1 * | 12/2009 | Kekre et al. | 710/31 |
| 7,657,705 | B2 * | 2/2010 | Mukherjee et al. | 711/114 |
| 7,716,332 | B1 * | 5/2010 | Topfl et al. | 709/226 |
| 7,805,564 | B2 * | 9/2010 | Matsunami et al. | 711/114 |
| 7,979,635 | B2 * | 7/2011 | Bates et al. | 711/114 |
| 8,146,092 | B2 * | 3/2012 | Ogawa et al. | 718/105 |

(Continued)

FOREIGN PATENT DOCUMENTS

JP 2008-310685 A 12/2008

OTHER PUBLICATIONS

Office Action dated Aug. 14, 2012 in Korean Application No. 10-2012-0071656.

*Primary Examiner* — Tuan Thai
*Assistant Examiner* — Mohamed Gebril
(74) *Attorney, Agent, or Firm* — Saliwanchik, Lloyd & Eisenschenk (57) ABSTRACT

Embodiments of the present invention provide a semiconductor storage device (SSD) system based on asymmetric RAID storage. Specifically, embodiments of this invention provide a set of (at least one) of RAID controllers coupled to a host computer. A set of storage drives is coupled to each asymmetric RAID controller. The RAID method and configuration of each storage device are dynamically adapted based on user policy parameters and storage performance characteristics.

20 Claims, 6 Drawing Sheets

(56) References Cited

U.S. PATENT DOCUMENTS

| | | | |
|---|---|---|---|
| 8,156,282 B1* | 4/2012 | Taylor | 711/114 |
| 8,161,237 B2* | 4/2012 | Hobbet et al. | 711/114 |
| 8,200,992 B2* | 6/2012 | Felch et al. | 713/300 |
| 8,244,959 B2* | 8/2012 | Fusella et al. | 711/103 |
| 8,296,483 B2* | 10/2012 | Cho | 710/62 |
| 8,341,501 B2* | 12/2012 | Franceschini et al. | 714/774 |
| 8,495,338 B2* | 7/2013 | Jeddeloh | 711/206 |
| 8,504,411 B1* | 8/2013 | Subasic et al. | 705/7.33 |
| 8,676,741 B2* | 3/2014 | Ulinski et al. | 706/52 |
| 2004/0006664 A1* | 1/2004 | Helzer et al. | 711/5 |
| 2004/0128618 A1* | 7/2004 | Datta | 715/513 |
| 2004/0177218 A1* | 9/2004 | Meehan et al. | 711/114 |
| 2006/0004957 A1* | 1/2006 | Hand et al. | 711/113 |
| 2006/0059320 A1* | 3/2006 | Akizuki | 711/158 |
| 2006/0101470 A1* | 5/2006 | Swanberg | 718/105 |
| 2007/0113008 A1* | 5/2007 | Scales et al. | 711/114 |
| 2007/0143540 A1* | 6/2007 | Lee et al. | 711/114 |
| 2008/0040564 A1* | 2/2008 | Kubo et al. | 711/154 |
| 2008/0084769 A1* | 4/2008 | RaghuRam et al. | 365/191 |
| 2008/0098106 A1* | 4/2008 | Mimatsu | 709/223 |
| 2008/0256292 A1* | 10/2008 | Flynn et al. | 711/114 |
| 2008/0263302 A1* | 10/2008 | Balluchi et al. | 711/167 |
| 2008/0288863 A1* | 11/2008 | Bohannon | 715/255 |
| 2008/0313398 A1 | 12/2008 | Koseki | |
| 2009/0204758 A1* | 8/2009 | Luning | 711/114 |
| 2009/0228643 A1* | 9/2009 | Kaki et al. | 711/103 |
| 2009/0319749 A1* | 12/2009 | Ogihara et al. | 711/170 |
| 2009/0327211 A1* | 12/2009 | McCune et al. | 707/1 |
| 2010/0037017 A1* | 2/2010 | Ryu et al. | 711/112 |
| 2010/0199036 A1* | 8/2010 | Siewert et al. | 711/112 |
| 2010/0217949 A1* | 8/2010 | Schopp et al. | 711/173 |
| 2010/0281230 A1* | 11/2010 | Rabii et al. | 711/165 |
| 2011/0010503 A1* | 1/2011 | Yamamura et al. | 711/128 |
| 2011/0145486 A1* | 6/2011 | Owa et al. | 711/103 |
| 2011/0258391 A1* | 10/2011 | Atkisson et al. | 711/118 |
| 2012/0047317 A1* | 2/2012 | Yoon et al. | 711/103 |
| 2012/0059978 A1* | 3/2012 | Rosenband et al. | 711/103 |
| 2012/0066439 A1* | 3/2012 | Fillingim | 711/103 |
| 2012/0066448 A1* | 3/2012 | Colgrove et al. | 711/114 |
| 2012/0198152 A1* | 8/2012 | Terry et al. | 711/114 |
| 2013/0007572 A1* | 1/2013 | Kotzur et al. | 714/800 |
| 2013/0086302 A1* | 4/2013 | Tressler et al. | 711/103 |
| 2013/0304979 A1* | 11/2013 | Zimmer et al. | 711/103 |

\* cited by examiner

SYSTEM ARCHITECTURE BASED ON ASYMMETRIC RAID STORAGE

CROSS-REFERENCE TO RELATED APPLICATION

This application is related in some aspects to commonly-owned, co-pending patent application Ser. No. 12/758,937, entitled "SEMICONDUCTOR STORAGE DEVICE", filed on Apr. 13, 2010. This application is also related in some aspects to commonly-owned, co-pending patent application Ser. No. 12/763,701, entitled "RAID CONTROLLED SEMICONDUCTOR STORAGE DEVICE", filed on Apr. 20, 2010. This application is also related in some aspects to commonly-owned, co-pending patent application Ser. No. 12/763,688, entitled "RAID CONTROLLER FOR A SEMICONDUCTOR STORAGE DEVICE", filed on Aug. 20, 2010. This application is also related in some aspects to commonly-owned, co-pending patent application Ser. No. 12/848,281, entitled "HYBRID RAID CONTROLLER", filed on Aug. 2, 2010. This application is also related in some aspects to commonly-owned, co-pending patent application Ser. No. 13/094,078, entitled "SYSTEM ARCHITECTURE BASED ON HYDBRID RAID STORAGE", filed on Apr. 26, 2011.

FIELD OF THE INVENTION

The present invention relates to a semiconductor storage device (SSD) system based on a configurable asymmetric redundant array of independent disks (RAID) storage. Specifically, the present invention relates to a set of (at least one) asymmetric RAID controllers configured to dynamically adapt the RAID configuration based on user policy parameters.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a semiconductor storage device (SSD) system based on asymmetric RAID storage. Specifically, embodiments of this invention provide a set of (at least one) RAID controllers coupled to a host computer. A set of storage drives is coupled to each asymmetric RAID controller. The RAID method and configuration of each storage device are dynamically adapted based on user policy parameters.

A first aspect of the present invention provides a semiconductor storage device (SSD) system architecture based on a configurable asymmetric redundant array of independent disks (RAID) storage, comprising: an asymmetric RAID controller coupled to a host computer; and a set of storage drives coupled to the asymmetric RAID controller, wherein the asymmetric RAID controller is adapted to evaluate a set of storage performance parameters and dynamically change the RAID configuration of each of the set of storage drives based on the evaluation.

A second aspect of the present invention provides a method for providing a semiconductor storage device (SSD) system architecture based on a configurable asymmetric redundant array of independent disks (RAID) storage, comprising: an asymmetric RAID controller coupled to a host computer; and a set of storage drives coupled to the asymmetric RAID controller, wherein the asymmetric RAID controller is adapted to evaluate a set of storage performance parameters and dynamically change the RAID configuration of each of the set of storage drives based on the evaluation.

A third aspect of the present invention provides a configurable disk array system including a set of storage drives and an asymmetric RAID controller for controlling storing of data in RAID format, wherein the asymmetric RAID controller is adapted to evaluate a set of storage performance parameters and dynamically change the RAID configuration of each of the set of storage drives based on the evaluation.

A fourth aspect of the present invention provides a method for providing a configurable disk array system including a set of storage drives and an asymmetric RAID controller for controlling storing of data in RAID format, wherein the asymmetric RAID controller is adapted to evaluate a set of storage performance parameters and dynamically change the RAID configuration of each of the set of storage drives based on the evaluation.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term flash memory means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of an I/O standard such as a serial attached small computer system interface (SAS)/serial advanced technology attachment (SATA) type according to an embodiment will be described in detail with reference to the accompanying drawings.

As indicated above, embodiments of the present invention provide a system architecture based on an asymmetric RAID storage. Specifically, embodiments of the present invention provide an asymmetric RAID controller coupled to a system board. A set of storage drives is coupled to the asymmetric RAID controller. The RAID method and configuration of each storage device are dynamically adapted based on user policy parameters.

The storage device of an I/O standard such as a serial attached small computer system interface (SAS)/serial advanced technology attachment (SATA) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Figure 1:
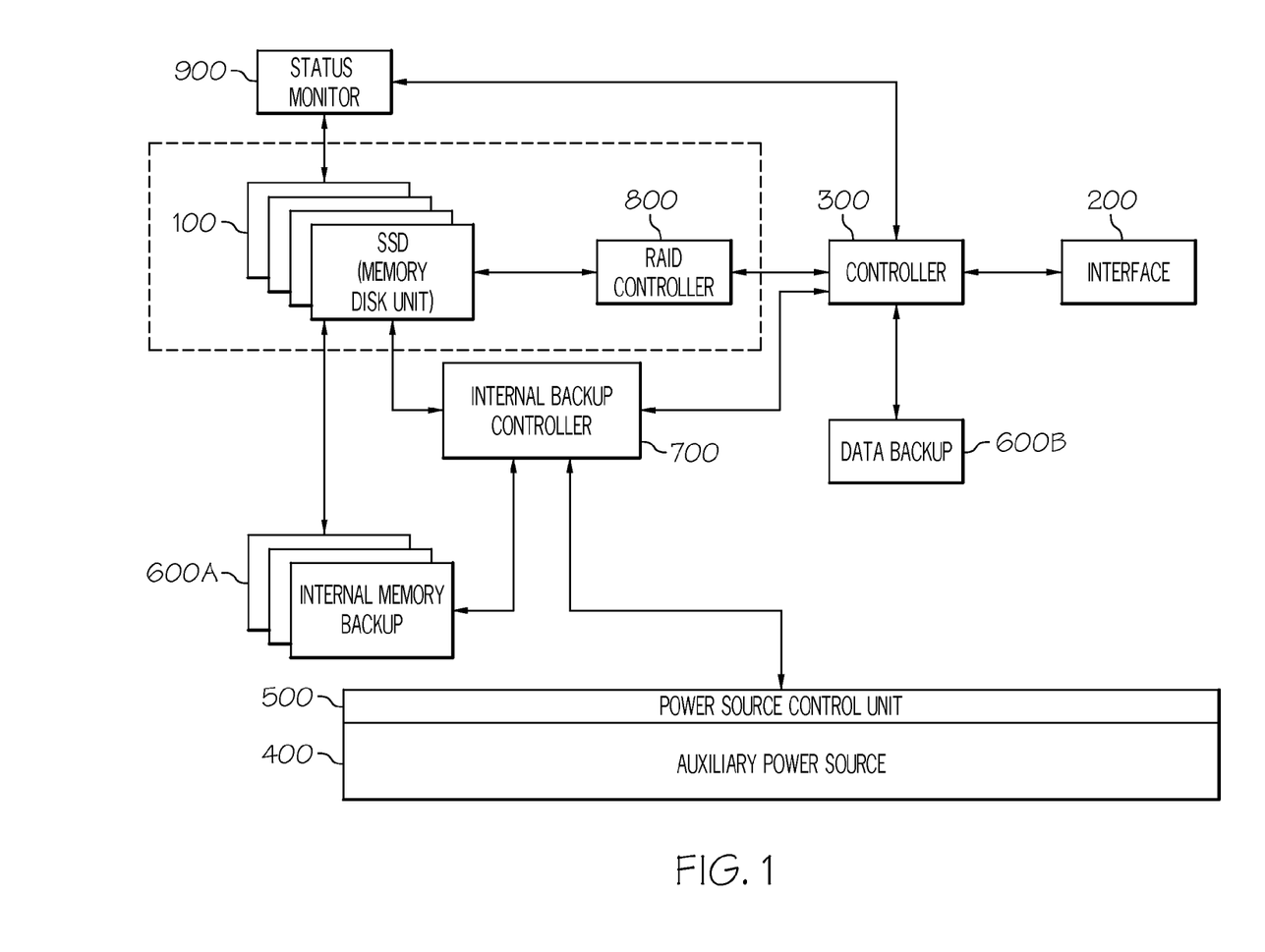
FIG. 1 is a diagram schematically illustrating a configuration of a RAID controlled storage device of a PCI-Express (PCI-e) type according to an embodiment of the present invention.

Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600A-B that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile and/or non-volatile semiconductor memories for high-speed data input/output (for example, flash memory, flash memory2, flash memory3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

As depicted, a PCI-e type RAID controller 800 can be directly coupled to any quantity of SSDs 100. Among other things, this allows for optimum control of SSDs 100. Also, among other things, the use of a RAID controller 800:

1. Supports the current backup/restore operations.
2. Provides additional and improved backup function by performing the following:
    a) the internal backup controller determines the backup (user's request order or the status monitor 900 detects power supply problems);
    b) the internal backup controller requests a data backup to SSDs;
    c) the internal backup controller requests an internal backup device to backup data immediately;
    d) monitors the status of the backup for the SSDs and internal backup controller; and
    e) reports the internal backup controller's status and end-op.

3. Provides additional and improved restore function by performing the following:
   a) the internal backup controller determines the restore (user's request order or the status monitor 900 detects power supply problems);
   b) the internal backup controller requests a data restore to the SSDs;
   c) the internal backup controller requests an internal backup device to restore data immediately;
   d) monitors the status of the restore for the SSDs and internal backup controller; and
   e) reports the internal backup controller status and end-op.

Figure 2:
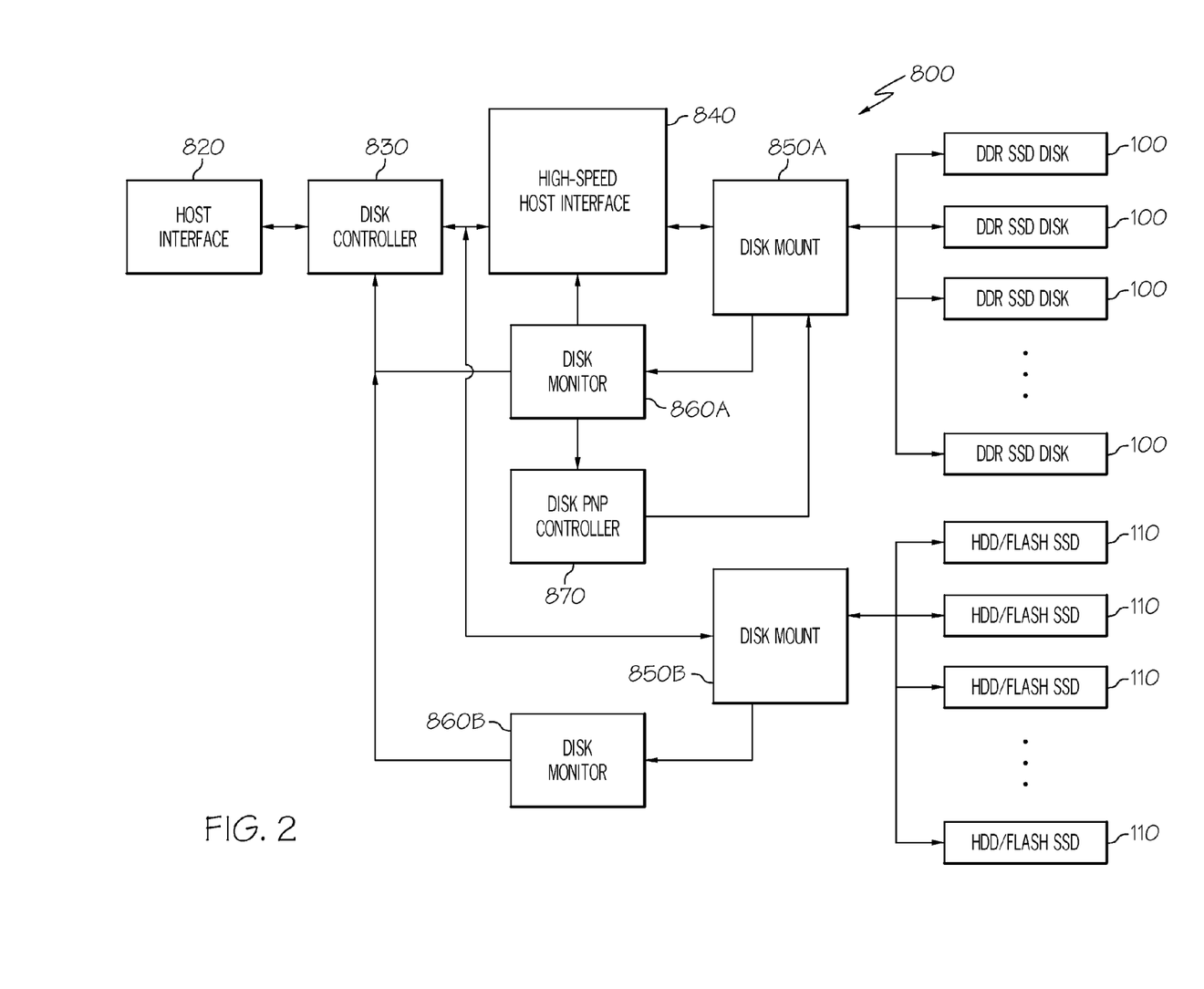
FIG. 2 is a diagram of the asymmetric RAID controller of FIG. 1.

Referring now to FIG. 2, a diagram of the asymmetric RAID controller 800 of FIGS. 1 and 2 as coupled to a set (at least one) of SSD memory disk units 100 and a set of HDD/flash memory units is shown in greater detail (collectively shown as unit 100 in FIG. 1). As depicted, asymmetric RAID controller generally 800 comprises: a host interface 820; a disk controller 830 coupled to host interface 820; and a high-speed host interface 840. Also coupled to disk controller 830 is a first disk monitoring unit 860A, which is coupled to the first disk mount 850A. In general, SSD memory disk units 100 are mounted on first disk mount 850A and are detected by first disk monitoring unit 860A. Still yet, shown coupled to disk controller 830 is a second disk monitoring unit 860B, which is coupled to a second disk mount 850B. In general, HDD/Flash memory units 110 are mounted on second disk mount 850B and are detected by second disk monitoring unit 860B. Disk plug and play (PnP controller 870) controls the functions and/or detection functions related to first disk mount 850A and second disk mount 850B. In general, asymmetric RAID controller 800 controls the operation of SSD memory disk units 100 and HDD/Flash memory units 110. This includes the detection of SSD memory disk units 100 and HDD/Flash memory units 110, the storage and retrieval of data therefrom, etc.

Figure 3:
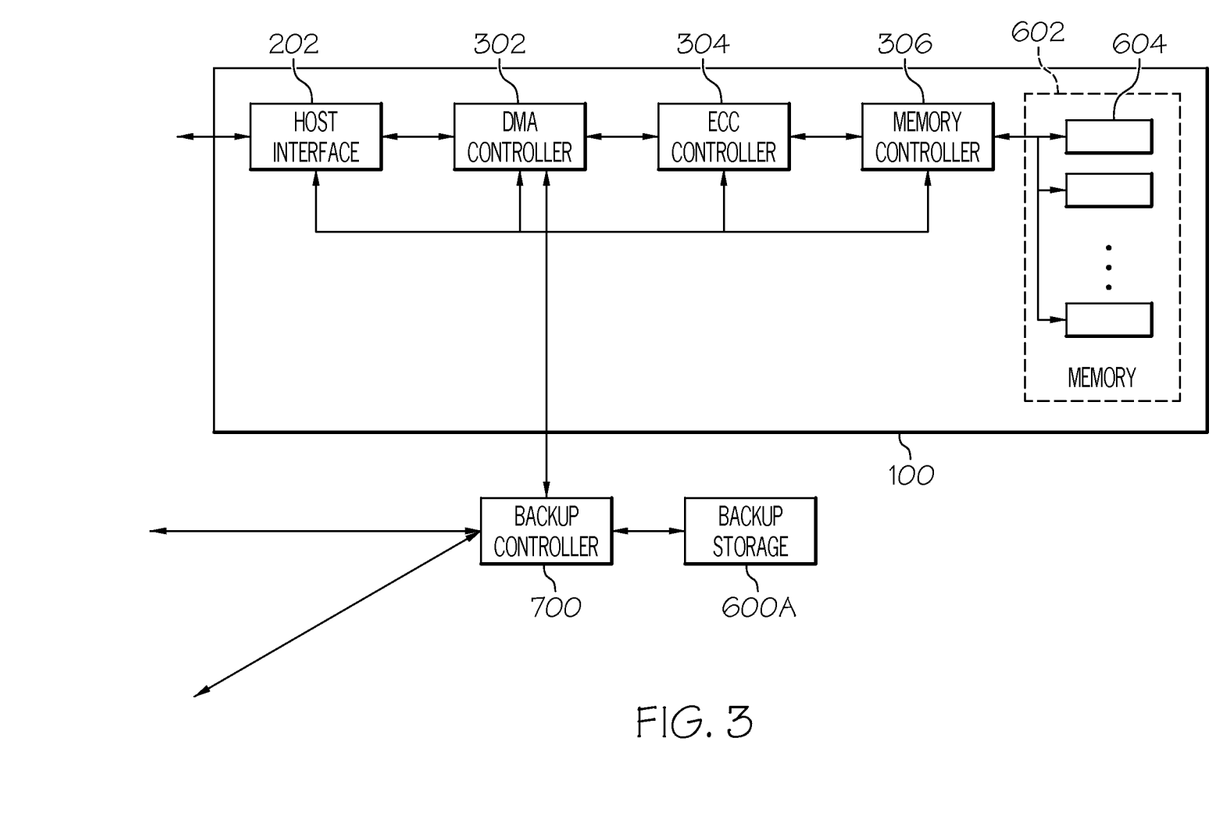
FIG. 3 is a diagram schematically illustrating a configuration of the high-speed SSD of FIG. 1.

Referring now to FIG. 3, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller 304; and a memory controller 306 for controlling one or more blocks 604 of memory 602 that are used as high-speed storage.

Figure 4:
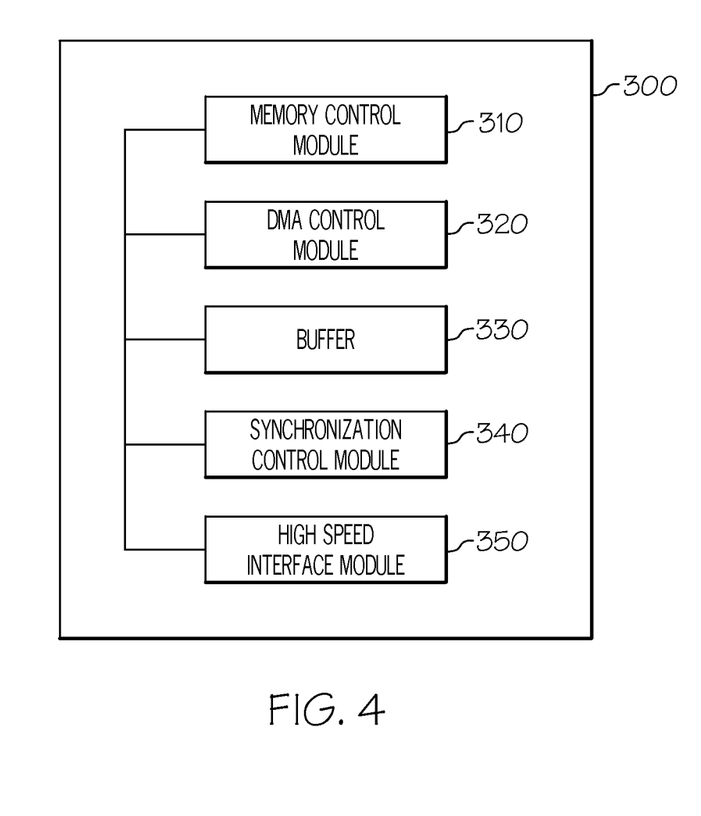
FIG. 4 is a diagram schematically illustrating a configuration of a controller unit in FIG. 1.

Referring now to FIG. 4, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Figure 5A:
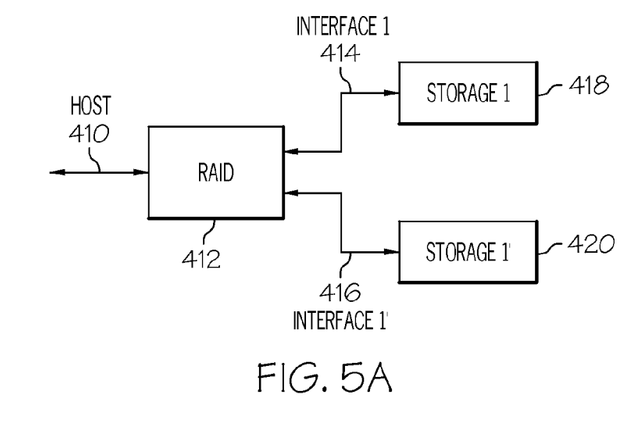
FIG. 5A is a diagram schematically illustrating a conventional RAID controller.

FIG. 5A is a diagram schematically illustrating a conventional symmetric and static RAID controller architecture. RAID is a technology that employs the simultaneous use of multiple storage drives to achieve greater levels of performance, reliability, and/or larger data volume sizes. This is achieved by presenting multiple hard drives as a single storage volume which simplifies storage management. In FIG. 5A, host 410 is coupled to RAID controller 412. Storage "1" 418 is coupled to RAID controller 412 via interface "1" 414. Storage "2" 420 is coupled to RAID controller 412 via interface "2" 416. Conventional RAID schemes assume symmetric and identical storages for operation. Such symmetry compromises RAID performance. In practice, storages are all different and may become even more different when in actual operation.

Figure 5B:
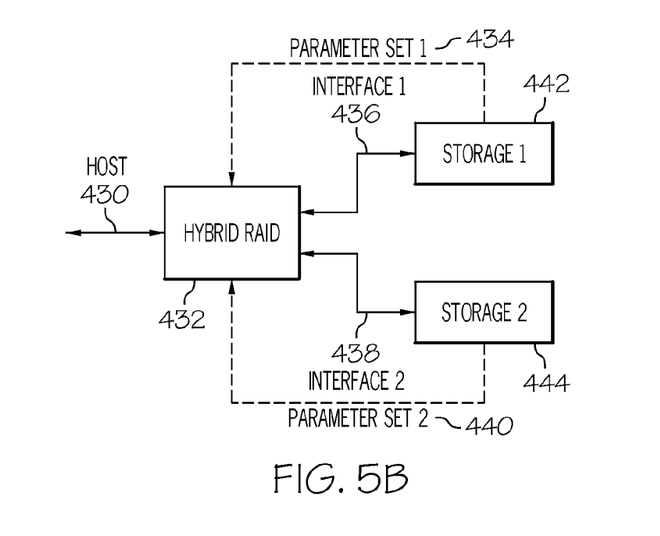
FIG. 5B is a diagram schematically illustrating the asymmetric RAID controller.

FIG. 5B is a diagram illustrating the asymmetric RAID controller architecture according to one embodiment of the present invention. Asymmetric RAID controller 432 is coupled to host 430. Storage "1" 442 is coupled to asymmetric RAID controller 432 via interface "1" 436. Storage "2" 444 is coupled to asymmetric RAID controller 432 via interface "2" 438. RAID for storage "1" 442 is controlled by parameter set "1" 434. RAID for storage "2" 444 is controlled by parameter set "2" 440. The asymmetric RAID controller allows asymmetry in RAID configuration to allow optimal performance in storage.

Data in RAID can be stored using various data storage techniques: striping, mirroring, striping parity, or a combination of these. Data mirroring stores the same data across two hard drives which provides redundancy and read speed. It is redundant because if a single drive fails, the other drive still has the data. Data striping distributes data across multiple hard drives. Striping alone is unreliable in terms of fault tolerance. Striping with parity solves the reliability problem because data is striped across multiple hard drives just like normal data striping, but a parity is generated and stored on one or more hard drives. Parity data allows a RAID volume to be reconstructed if one or two hard drives fail within the array.

Each of these techniques has certain advantages and disadvantages based on user goals. RAID optimization goals are based on a user-set policy. The user policy is governed by a parameter set specified by the user that affects how the data storage techniques are applied to the RAID configuration and method. The parameter set relates to RAID hardware parameters and includes, but is not limited to, latency, capacity, throughput, cache configuration, and reliability. The RAID controller evaluates the parameter set and determines a certain storage configuration which allows for better optimization of user goals based on the user-set policy.

Figure 6:
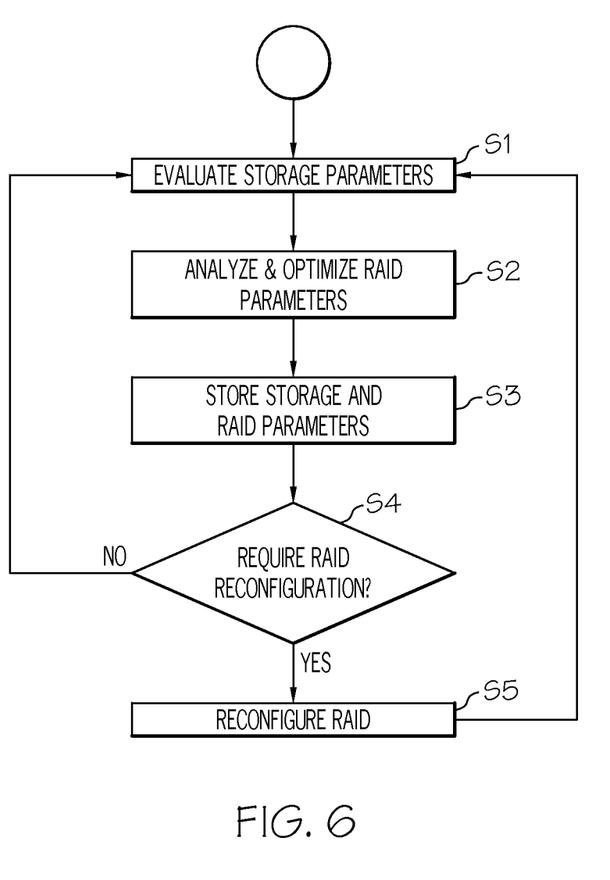
FIG. 6 is a flow diagram illustrating the asymmetric RAID data storage method.

FIG. 6 shows a flow diagram illustrating the asymmetric RAID data storage method. The asymmetric RAID controller measures and evaluates attached storage performance parameters (step S1). The RAID controller analyzes storage parameters to achieve asymmetric and dynamic RAID goals such as latency, capacity, throughput, and reliability (step S2). The RAID controller updates RAID parameters when a storage parameter change occurs under the same RAID configuration (step S3). If RAID reconfiguration is required (step S4), then the RAID is reconfigured based on the RAID parameters and goals (step S5). Also, the RAID controller forces a RAID configuration change under certain extreme conditions such as whole disk failure.

One RAID technique, striping, takes a single chunk of data and spreads that data across multiple drives. The advantage that striping has is in improved performance. Twice the amount of data can be written in a given time frame to the two drives compared to that same data being written to a single drive. Referring back to FIG. 5B, consider the example in which the latency storage parameters are set differently between storage "1" and storage "2". Latency, or delay, is how much time it takes for a packet of data to get from one designated point to another. If the RAID latency storage parameter for storage "1" is lower than the latency parameter for storage "2", striping can be done such that the beginning part of the file or block is stored in storage "1", while the latter part is stored in storage 2", thereby reducing overall latency. In extreme cases where the latency parameter for storage "1" is significantly lower than that of storage "2", RAID latency is further optimized by changing the role (partially) of storage "1" to a RAIDed cache of storage "2".

Further, if the RAID throughput storage parameter for storage "1" is higher than the throughput parameter for storage "2", striping can be done such that more data is stored in storage "1". Throughput is maximized because Storage "1" holds a higher portion of the file or block than storage "2". When loading the file or block, the file or block is loaded proportionally until the entire block or file is fully loaded.

Where the RAID capacity storage parameter for storage "1" is lower than the capacity storage parameter for storage "2", the RAID controller adjusts striping proportionally when storing data. For cases where the RAID redundancy storage parameter for storage "1" is lower than the same parameter for storage "2", the RAID controller assigns more data to storage "2" for better redundancy.

The examples listed above are exemplary only and not intended to be limiting. For example, the number of storage devices could be more than two, and many performance goals can be achieved when there are certain number of comparable storages. Any technique or combination of techniques based on the user-set policy to assist in achieving one or more user goals may be employed by the RAID controller.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600A-B is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host and deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The present invention supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A semiconductor storage device (SSD) system architecture based on a configurable asymmetric redundant array of independent disks (RAID) storage, comprising:
   an asymmetric RAID controller coupled to a host computer; and
   a set of storage drives coupled to the asymmetric RAID controller,
   wherein the asymmetric RAID controller is adapted to acquire and evaluate a set of storage performance parameters including latency, throughput, and capacity at runtime and dynamically change the RAID configuration of each of the set of storage drives based on the evaluation,
   wherein the asymmetric RAID controller is configured to store a beginning part of a file or block in a storage drive having relatively lower latency among the set of storage drives and to simultaneously store a latter part of the file or block in a storage drive having relatively higher latency among the set of storage drives based on the dynamically changed RAID configuration of each storage drive, when the file or block is stored in the set of storage drives, and
   wherein the asymmetric RAID controller is dynamically configured at runtime to store a larger part of the file or block in a first storage drive having relatively higher throughput or relatively higher capacity among the set of storage drives when the file or block is stored in the set of storage drives, and store only the remaining smaller part of the same file or block in a second storage drive having relatively lower throughput or relatively lower capacity among the set of storage drives when the file or block is stored in the set of storage drives; and wherein a ratio of a volume of the larger part of the file or block and a volume of the smaller part of the same file or block corresponds to a ratio of the relative capacity of the first storage drive and the relative capacity of the second storage drive or corresponds to a ratio of the relative throughput of the first storage drive and the relative throughput of the second storage drive.

2. The system architecture Of claim 1, further comprising:
means for accepting the set of storage performance parameters from a user; and
means for storing the set of storage performance parameters.

3. The system architecture of claim 1, wherein the set of performance parameters further includes at least one of: cache configuration and reliability.

4. The system architecture of claim 1, wherein each of the set of storage drives is coupled to the asymmetric RAID controller via a dedicated interface.

5. The system architecture of claim 1, wherein the asymmetric RAID controller is further configured to change the RAID configuration of at least one of the set of storage drives when a predefined condition occurs.

6. A method for providing a semiconductor storage device (SSD) system architecture based on a configurable asymmetric redundant array of independent disks (RAID) storage, comprising:
an asymmetric RAID controller coupled to a host computer; and
a set of storage drives coupled to the asymmetric RAID controller,
wherein the asymmetric RAID controller is adapted to acquire and evaluate a set of storage performance parameters including latency, throughput, and capacity at runtime and dynamically change the RAID configuration of each of the set of storage drives based on the evaluation,
wherein the asymmetric RAID controller is configured to store a beginning part of a file or block in a storage drive having relatively lower latency among the set of storage drives and to simultaneously store a latter part of the file or block in a storage drive having relatively higher latency among the set of storage drives based on the dynamically changed RAID configuration of each storage drive, when the file or block is stored in the set of storage drives, and
wherein the asymmetric RAID controller is dynamically configured at runtime to store a larger part of the file or block in a first storage drive having relatively higher throughput or relatively higher capacity among the set of storage drives when the file or block is stored in the set of storage drives, and store only the remaining smaller part of the same file or block in a second storage drive having relatively lower throughput or relatively lower capacity among the set of storage drives when the file or block is stored in the set of storage drives; and wherein a ratio of a volume of the larger part of the file or block and a volume of the smaller part of the same file or block corresponds to a ratio of the relative capacity of the first storage drive and the relative capacity of the second storage drive or corresponds to a ratio of the relative throughput of the first storage drive and the relative throughput of the second storage drive.

7. The method claim 6, further comprising:
accepting the set of storage performance parameters from a user; and
storing the set of storage performance parameters.

8. The method of claim 6, wherein the set of performance parameters further includes at least one of: cache configuration and reliability.

9. The method of claim 6, wherein each of the set of storage drives is coupled to the asymmetric RAID controller via a dedicated interface.

10. The method of claim 6, wherein the asymmetric RAID controller is further configured to change the RAID configuration of at least one of the set of storage drives when a predefined condition occurs.

11. A configurable disk array system including a set of storage drives and an asymmetric RAID controller for controlling storing of data in RAID format, wherein the asymmetric RAID controller is adapted to acquire and evaluate a set of storage performance parameters including latency, throughput, and capacity at runtime and dynamically change the RAID configuration of each of the set of storage drives based on the evaluation,
wherein the asymmetric RAID controller is configured to store a beginning part of a file or block in a storage drive having relatively lower latency among the set of storage drives and to simultaneously store a latter part of the file or block in a storage drive having relatively higher latency among the set of storage drives based on the dynamically changed RAID configuration of each storage drive, when the file or block is stored in the set of storage drives, and
wherein the asymmetric RAID controller is dynamically configured at runtime to store a larger part of the file or block in a first storage drive having relatively higher throughput or relatively higher capacity among the set of storage drives when the file or block is stored in the set of storage drives, and store only the remaining smaller part of the same file or block in a second storage drive having relatively lower throughput or relatively lower capacity among the set of storage drives when the file or block is stored in the set of storage drives; and wherein a ratio of a volume of the larger part of the file or block and a volume of the smaller part of the same file or block corresponds to a ratio of the relative capacity of the first storage drive and the relative capacity of the second storage drive or corresponds to a ratio of the relative throughput of the first storage drive and the relative throughput of the second storage drive.

12. The disk array system of claim 11, further comprising:
means for accepting the set of storage performance parameters from a user; and
means for storing the set of storage performance parameters.

13. The disk array system of claim 11, wherein the set of performance parameters further includes at least one of: cache configuration and reliability.

14. The disk array system of claim 11, wherein each of the set of storage drives is coupled to the asymmetric RAID controller via a dedicated interface.

15. The disk array system of claim 11, wherein the asymmetric RAID controller is further configured to change the RAID configuration of at least one of the set of storage drives when a predefined condition occurs.

16. A method for providing a configurable disk array system including a set of storage drives and an asymmetric RAID controller for controlling storing of data in RAID format, wherein the asymmetric RAID controller is adapted to acquire and evaluate a set of storage performance parameters including latency, throughput, and capacity at runtime and dynamically change the RAID configuration of each of the set of storage drives based on the evaluation,     wherein the asymmetric RAID controller is configured to store a beginning part of a file or block in a storage drive having relatively lower latency among the set of storage drives and to simultaneously store a latter part of the file or block in a storage drive having relatively higher latency among the set of storage drives based on the dynamically changed RAID configuration of each storage drive, when the file or block is stored in the set of storage drives, and     wherein the asymmetric RAID controller is dynamically configured at runtime to store a larger part of the file or block in a first storage drive having relatively higher throughput or relatively higher capacity among the set of storage drives when the file or block is stored in the set of storage drives, and store only the remaining smaller part of the same file or block in a second storage drive having relatively lower throughput or relatively lower capacity among the set of storage drives when the file or block is stored in the set of storage drives: and wherein a ratio of a volume of the larger part of the file or block and a volume of the smaller part of the same file or block corresponds to a ratio of the relative capacity of the first storage drive and the relative capacity of the second storage drive or corresponds to a ratio of the relative throughput of the first storage drive and the relative throughput of the second storage drive.

17. The method of claim 16, further comprising:
accepting the set of storage performance parameters from a user; and
storing the set of storage performance parameters.

18. The method of claim 16, wherein the set of performance parameters further includes reliability.

19. The method of claim 16, wherein each of the set of storage drives is coupled to the asymmetric RAID controller via a dedicated interface.

20. The method of claim 16, wherein the asymmetric RAID controller is further configured to change the RAID configuration of at least one of the set of storage drives when a predefined condition occurs.

\* \* \* \* \*